US012073974B2

(12) United States Patent
Lee et al.

(10) Patent No.: US 12,073,974 B2
(45) Date of Patent: Aug. 27, 2024

(54) TRANSFORMER WITH TRANSPARENT TERMINAL BLOCK

(71) Applicant: The Toro Company, Bloomington, MN (US)

(72) Inventors: Hyok Lee, Riverside, CA (US); William Baptist, Bloomington, MN (US)

(73) Assignee: The Toro Company, Bloomington, MN (US)

( * ) Notice: Subject to any disclaimer, the term of this patent is extended or adjusted under 35 U.S.C. 154(b) by 848 days.

(21) Appl. No.: 17/191,271

(22) Filed: Mar. 3, 2021

(65) Prior Publication Data

US 2021/0287839 A1 Sep. 16, 2021

Related U.S. Application Data

(60) Provisional application No. 62/989,449, filed on Mar. 13, 2020.

(51) Int. Cl.
*H01F 27/02* (2006.01)
*F21V 19/00* (2006.01)
*H01F 27/29* (2006.01)

(52) U.S. Cl.
CPC .......... *H01F 27/022* (2013.01); *F21V 19/007* (2013.01); *H01F 27/292* (2013.01)

(58) Field of Classification Search
CPC ..... H01F 27/022; H01F 27/292; F21V 19/007
See application file for complete search history.

(56) References Cited

U.S. PATENT DOCUMENTS 5,381,331 A * 1/1995 Mock ..................... A01G 25/16 239/69
6,402,049 B1 * 6/2002 Youngs, Jr. .......... A01G 25/165 239/69
7,444,207 B2 * 10/2008 Nickerson .............. G05B 15/02 239/69
7,613,546 B2 * 11/2009 Nelson ................. A01G 25/165 239/69
8,234,014 B1 * 7/2012 Ingle .................... A01G 25/165 700/15
RE45,143 E * 9/2014 Mullen ................ H05B 39/044 29/830
10,060,610 B1 * 8/2018 Borgeson .............. F21V 23/001
2003/0042038 A1 * 3/2003 Masson ..................... H02G 3/14 174/66
2010/0276265 A1 * 11/2010 Park ..................... H01H 9/0264 200/293
2014/0081469 A1 * 3/2014 Kah, Jr. ................. A01G 25/16 700/284
2014/0268630 A1 * 9/2014 Samuels ............ H01H 13/7057 362/23.03
2021/0036447 A1 * 2/2021 Walker ............... H01R 12/7094

FOREIGN PATENT DOCUMENTS

JP 2006019173 A * 1/2006
KR 20000024922 A * 5/2000
KR 100812289 B1 * 3/2008

* cited by examiner

*Primary Examiner* — Malcolm Barnes
(74) *Attorney, Agent, or Firm* — Inskeep IP Group, Inc.

(57) ABSTRACT

A power transformer assembly is described that includes a light positioned and configured to illuminate a terminal block that is at least partially composed of transparent or translucent materials. Illuminating the terminal block provides additional light in this area to facilitate making or removing wire connections.

19 Claims, 13 Drawing Sheets

TRANSFORMER WITH TRANSPARENT TERMINAL BLOCK

RELATED APPLICATIONS

This application claims priority to U.S. Provisional Application Ser. No. 62/989,449 filed Mar. 13, 2020 entitled Transformer with Transparent Terminal Block, which is hereby incorporated herein by reference in its entirety.

BACKGROUND OF THE INVENTION

Outdoor lighting can be used to illuminate various spaces outside of a home, business, or other building. Typically, low voltage lights are used for such lighting, requiring them to be wired to a transformer that transforms the higher voltage AC power (e.g., 120 VAC) to low voltage AC power (e.g., 12, 14, 16, 18, 20, 22, and 24 VAC). This lower voltage power can be connected to and used by the lighting (e.g., LED light bulbs). Additional background can be found in U.S. patent USRE45143, U.S. application Ser. No. 15/729,538, and U.S. application Ser. No. 15/880,427, which are all incorporated by reference herein.

Typically, the transformers used to step down higher voltage AC power are located within a protective housing and include a plurality of wire connection points (e.g., a terminal block) that supply lower voltage AC power to wires connected to the outdoor lights. Depending on the location of the transformer housing on a property, the interior of the transformer housing may not be well lit and therefore connecting or removing wires to the low voltage power connections can be difficult. In some transformer housing designs, both the front panel and the top panel are configured to open and therefore are not ideal locations to provide illumination to the terminal block. Hence, what is needed is a transformer housing that is better illuminated to facilitate wire connections to the low voltage power connections (i.e., terminal block).

SUMMARY OF THE INVENTION

The present invention is generally directed to a power transformer assembly that includes a light positioned and configured to illuminate a terminal block that is at least partially composed of transparent or translucent materials. Illuminating the terminal block provides additional light in this area to facilitate making or removing wire connections.

In one embodiment, the terminal block is located within a power transformer housing with one or more removable panels, such as a removable top panel and/or a removable side panel.

In one embodiment, a light source is positioned underneath the terminal block composed of transparent or translucent materials.

In one embodiment, the terminal block is configured to direct light on an adjacent label or indicia designated for each terminal of the terminal block.

In one embodiment, the label is positioned over a plurality of apertures opening near the light so as to further illuminate the label from beneath it.

In one embodiment, the terminal block comprises a transparent terminal strip configured to house and support a plurality of lugs.

In one embodiment, the power transformer assembly may also include a switch, button or similar mechanism that interrupts power to the light when one or more of the doors or panels of the assembly are opened. In this respect, the light only turns on when a user accesses the interior of the assembly.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
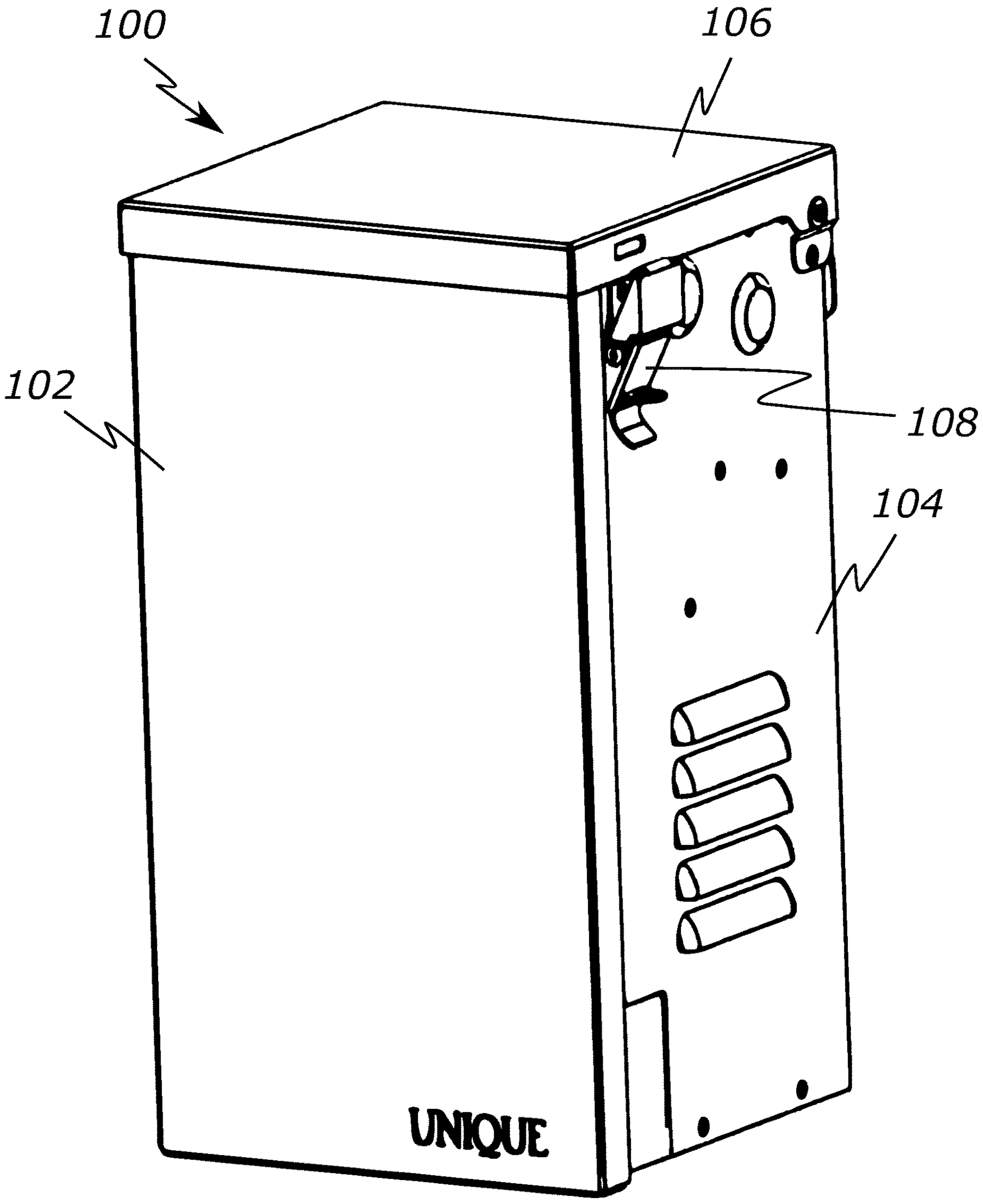
FIG. 1 is an outside view of a front of a transformer assembly.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In that respect, elements and functionality of one embodiment not necessarily only limited to that embodiment and may be combined with other embodiments shown herein in any manner that would result in a functional embodiment. The terminology used in the detailed description of the embodiments illustrated in the accompanying drawings is not intended to be limiting of the invention. In the drawings, like numbers refer to like elements, including between different embodiments.

As discussed in greater detail below, the present invention is directed to a transformer assembly that includes a transformer housing with a terminal block composed of clear or translucent materials. A light is disposed near a bottom of the terminal block and is activated when a housing door is opened. In this manner, the terminal block is illuminated for the user and thereby allows for low voltage wires to be more easily connected. Unlike a light placed in other locations which may cast shadows or be blocked by the user's hands, the light emanates from the transparent terminal block and thereby allows the user to better view the wires and the terminals screws to ensure a proper connection.

Figure 2:
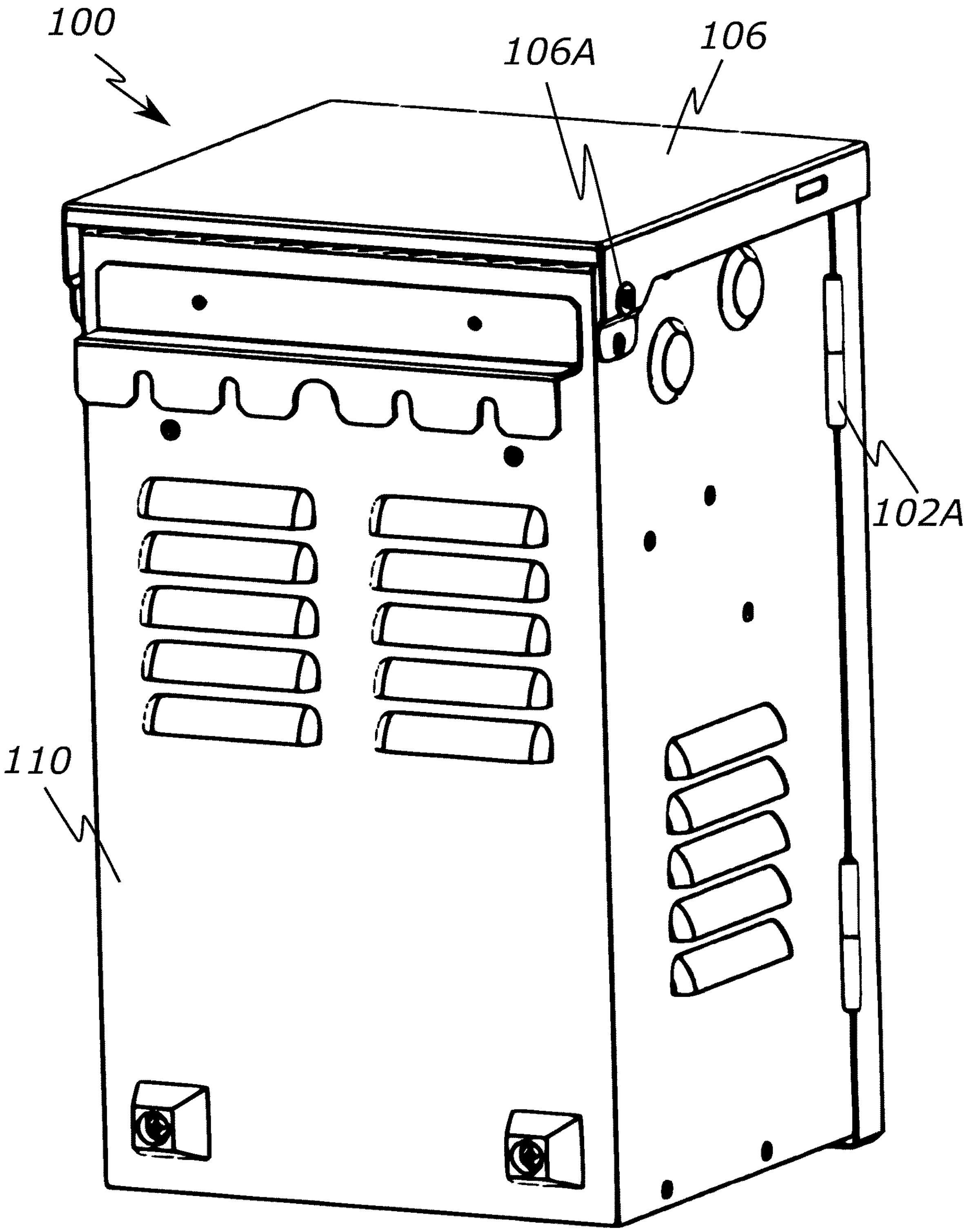
FIG. 2. is an outside view of a back of the transformer assembly.

FIGS. 1 and 2 illustrate views of one embodiment of a transformer assembly 100 having two metal side panels 104, a metal back panel 110, and a metal front door panel 102 that is mounted on side hinges 102A to pivot open. The panels 110, 104 may be separate panels or a single unitary component. A metal top cover 106 is mounted on hinges 106A to allow it to open and can include a latch 108 to secure it in place. While a metal, such as stainless steel is preferred, other, non-metal materials are also possible for these components.

Figure 3:
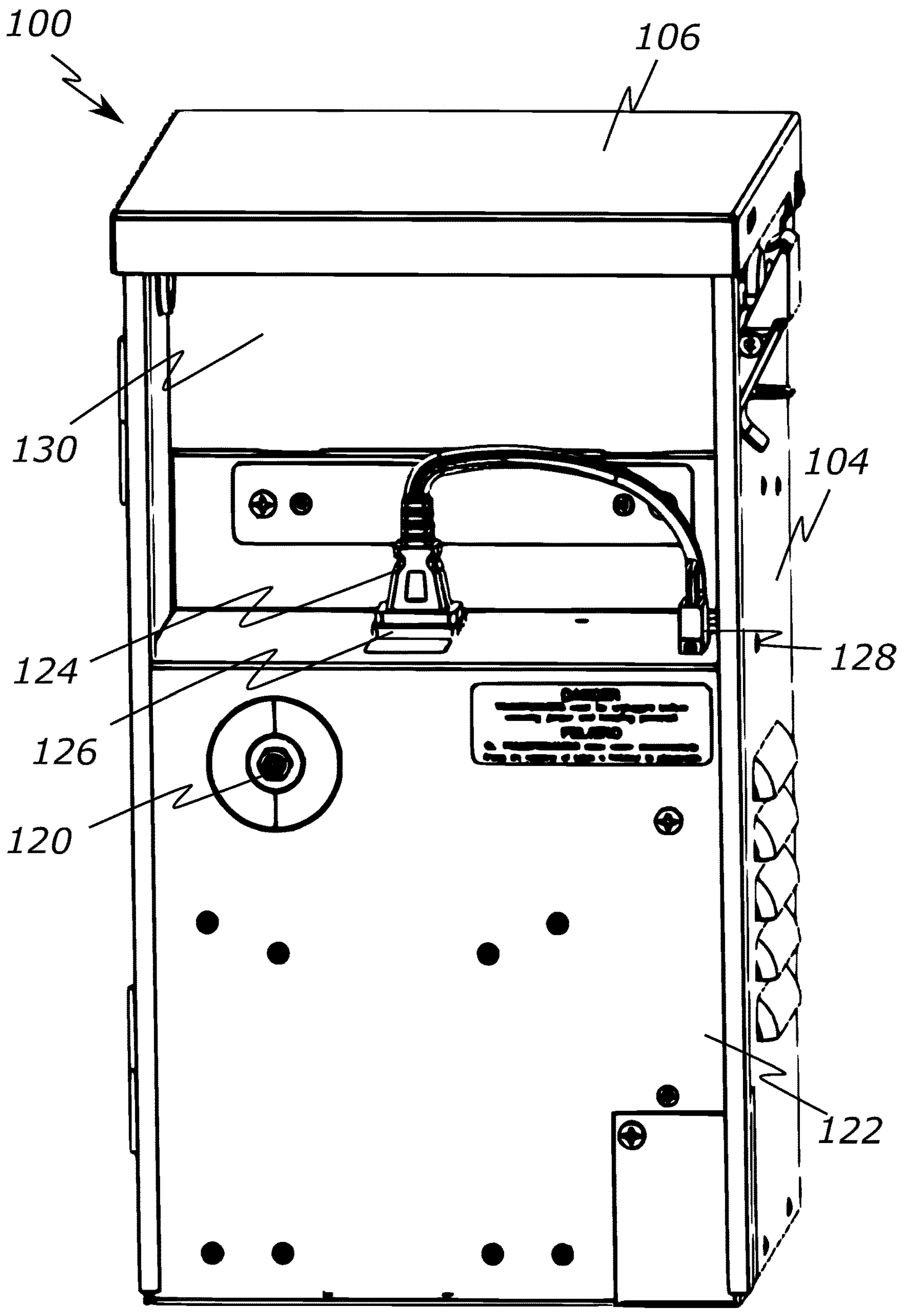
FIG. 3 is a view of the transformer assembly without a front door panel.
Figure 4:
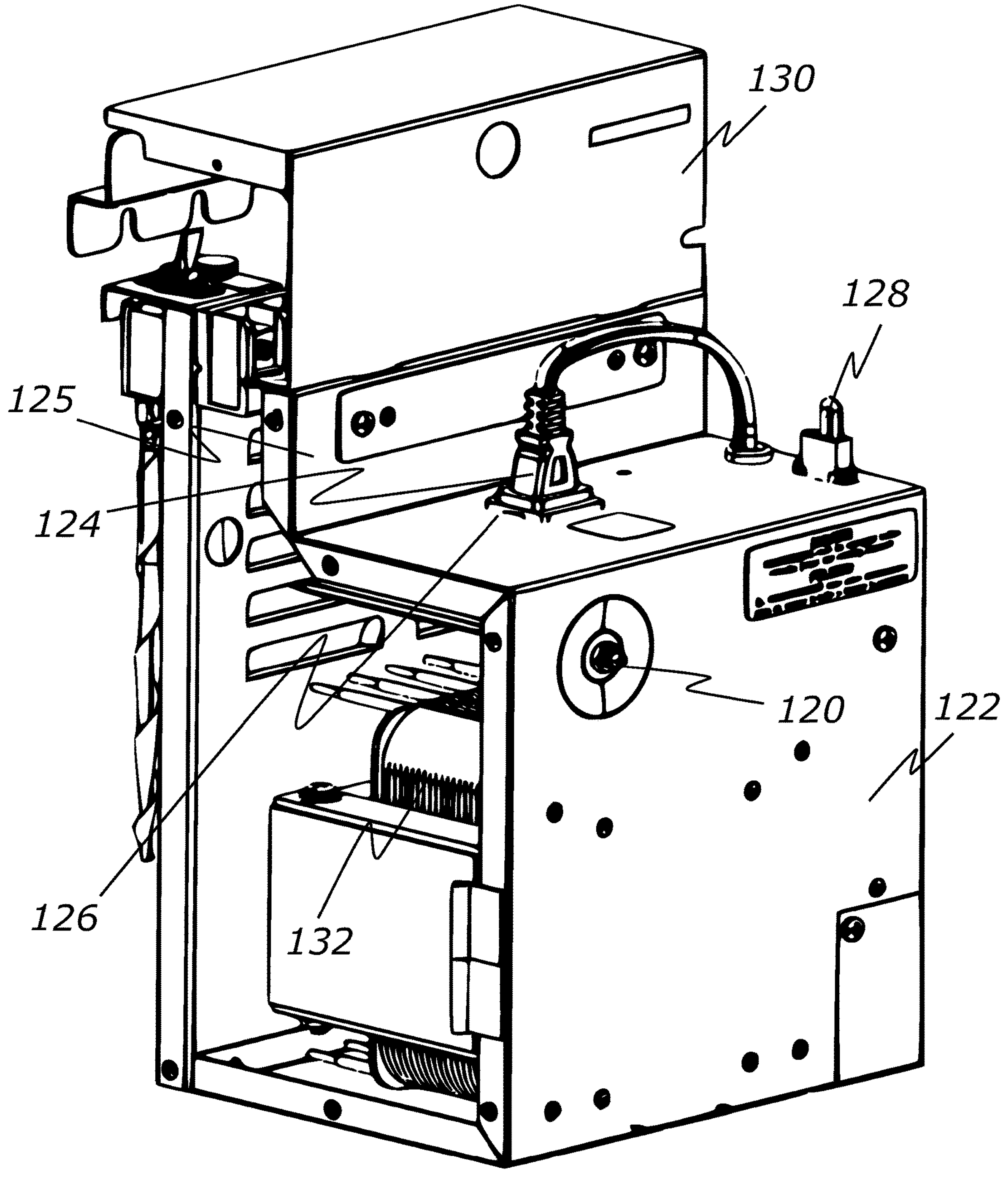
FIG. 4 is a view of the transformer assembly with all exterior panels removed.
Figure 5:
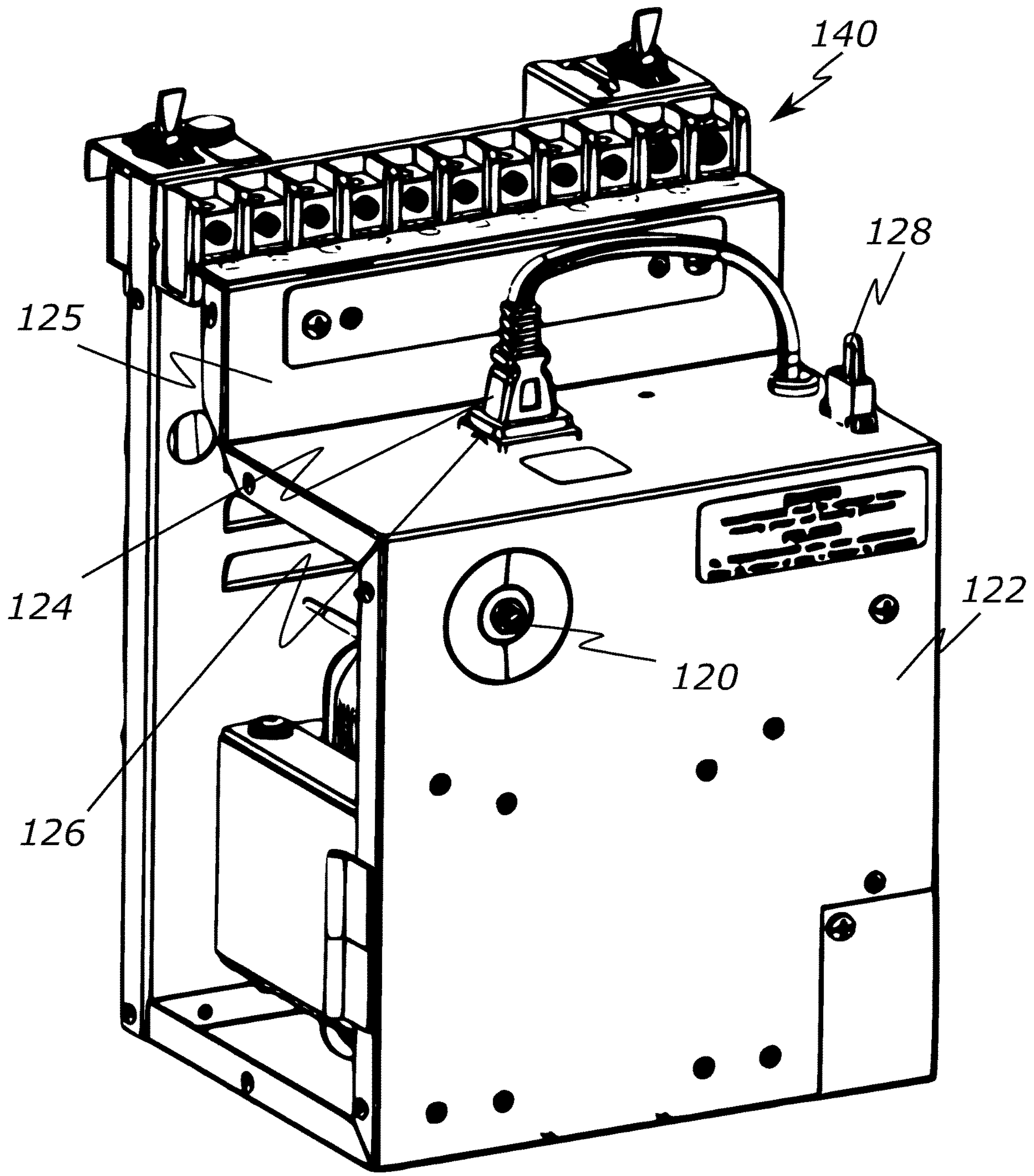
FIG. 5 is a view of the transformer assembly with all exterior panels removed.

FIG. 3 illustrates the transformer assembly 100 without the front door panel 102, which exposes a two-prong electrical plug and receptacle 126 which connects the outside 120 VAC power to the power transformer (located behind panel 122 and shown in FIG. 4) and a shorting plug 128. The shorting plug 128 can be replaced with a photocell to complete a circuit when it is dark and open the circuit when it is bright, thereby turning on the transformer when the sun sets and turning off the transformer during the day. Referring to FIGS. 3 and 4, a protective enclosure 130 connects to a top of vertical panel 125 and can be removed to expose the terminal block assembly 140, as seen best in FIGS. 5-8.

As discussed further below, a light 150 (FIG. 8) is located below and/or adjacent to the terminal block assembly 140. When the front door panel 102 is closed, it depresses a switch 120 on the front of panel 122, interrupting power to the light source 150. When the door panel 102 is opened, the switch 120 is released to complete a circuit with the light source 150 and thereby turn it on. This light illuminates through the terminal block assembly 140, which is composed of mostly translucent or transparent materials that allow the light to shine through.

Figure 15:
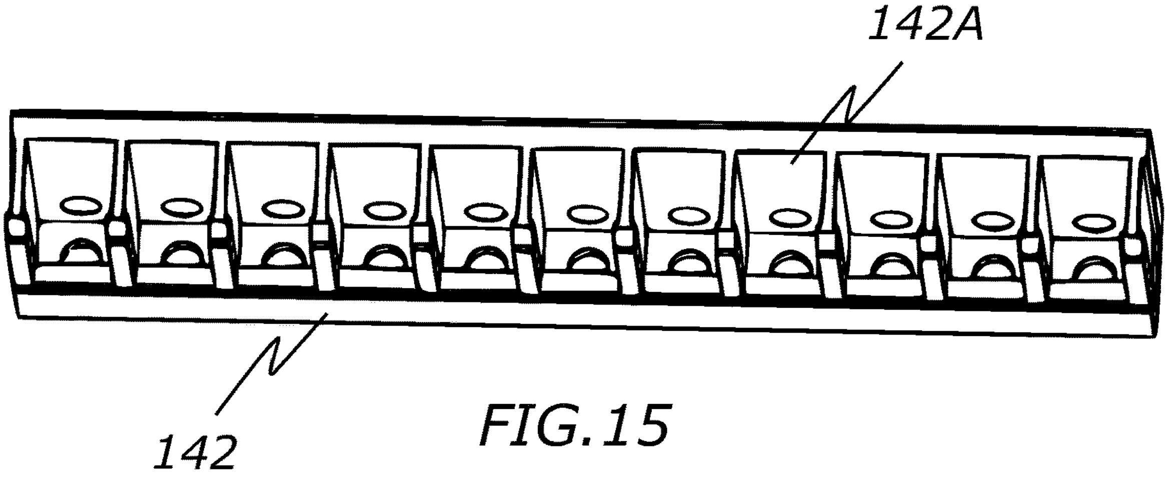
FIG. 15 is a top view of the terminal strip of the terminal block assembly.
Figure 16:
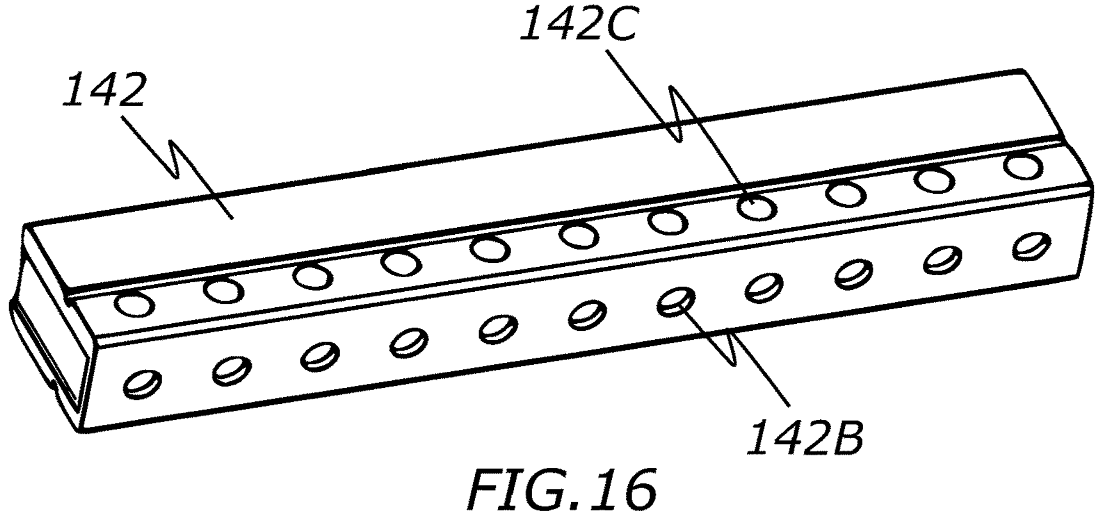
FIG. 16 is a back view of the terminal strip of the terminal block assembly.

Referring to FIGS. 9-16, the terminal block assembly 140 is composed of a terminal strip 142 and a plurality of terminal lugs 144. The terminal strip 142 has an elongated shape with a plurality of walls that form lug spaces 142A that are each sized and shaped to accommodate a terminal lug 144. In one embodiment, the lug spaces are open at the top and front side of the terminal block assembly 140. In one example, 11 lug spaces 142A are created. In another example, the terminal strip 142 has lug spaces 142A within the range of 2 to 15. As seen in FIGS. 15 and 16, the bottom surface of the terminal strip 142 has an aperture 142B and the back side has an aperture 142C which align with components of the terminal lugs 144 as discussed below.

The terminal strip 142 is composed of a transparent or translucent material, such as a polymer (e.g., polycarbonate, acrylic, polystyrene, or polypropylene). It should be understood that any substantially electrically insulative and translucent/transparent materials can be used.

Alternate illumination techniques are also possible. For example, the terminal strip 142 may include a plurality of fiber optic elements sized and positioned to convey light from below the strip 142 to areas around the lugs 144.

In another embodiment, the terminal strip 142 may include one or more LED lights positioned on a surface of the strip 142. For example, the LEDs may be positioned on a bottom of the terminal strip 142 to illuminate its transparent material. Alternately, the terminal strip 142 may not necessarily be composed of transparent material and the LED lights may be positioned along a top, front-side, or similar position so that they illuminate the lugs 144.

The terminal lugs 144 have a rectangular cube shaped body 144A with a top wire aperture 144B and a bottom wire aperture 144E that wires can be placed into. Specifically, aperture 144E accepts wires of varying low voltage from the power transformer 132, while aperture 144B typically accepts a wire connecting to the user's low voltage lighting. The wire in aperture 144B is secured via a hex screw 144C on the front face of the lug body 144A and the wire in aperture 144E is secured via a hex screw 144D on the back of the lug body 144A. Both screws 144C and 144D screw into spaces where their respective wires are located, locking them into place and bridging an electrical connection between the two wires. In one embodiment, the lug body 144A has two separately enclosed spaces for each wire.

When a terminal lug 144 is properly positioned within a lug space 142A, aperture 144E aligns with aperture 142B, and screw 144D aligns with aperture 142C, which allows access to both components of the terminal lug 144 through the terminal strip 142. In one embodiment, the terminal lug body 144A is composed of an electrically conductive material, such as tin-plated aluminum. However, the lug body 144A may alternately be composed of a translucent material with some conductive metals inside to bridge the connection between the wires. For example, the body 144A may be composed of a translucent plastic and the interior may be coated or have metal components to facilitate conductivity.

In one example, the lug spaces 142A have a front-to-back depth of about 0.758 inch, a width of about 52 inch, and the terminal strip 142 has a width of about 7.29 inches. In one example, the terminal lug 144 has a height of about 1 inch, a front-to-back depth of about 0.51 inch, and a width of about 0.58 inch.

Figure 6:
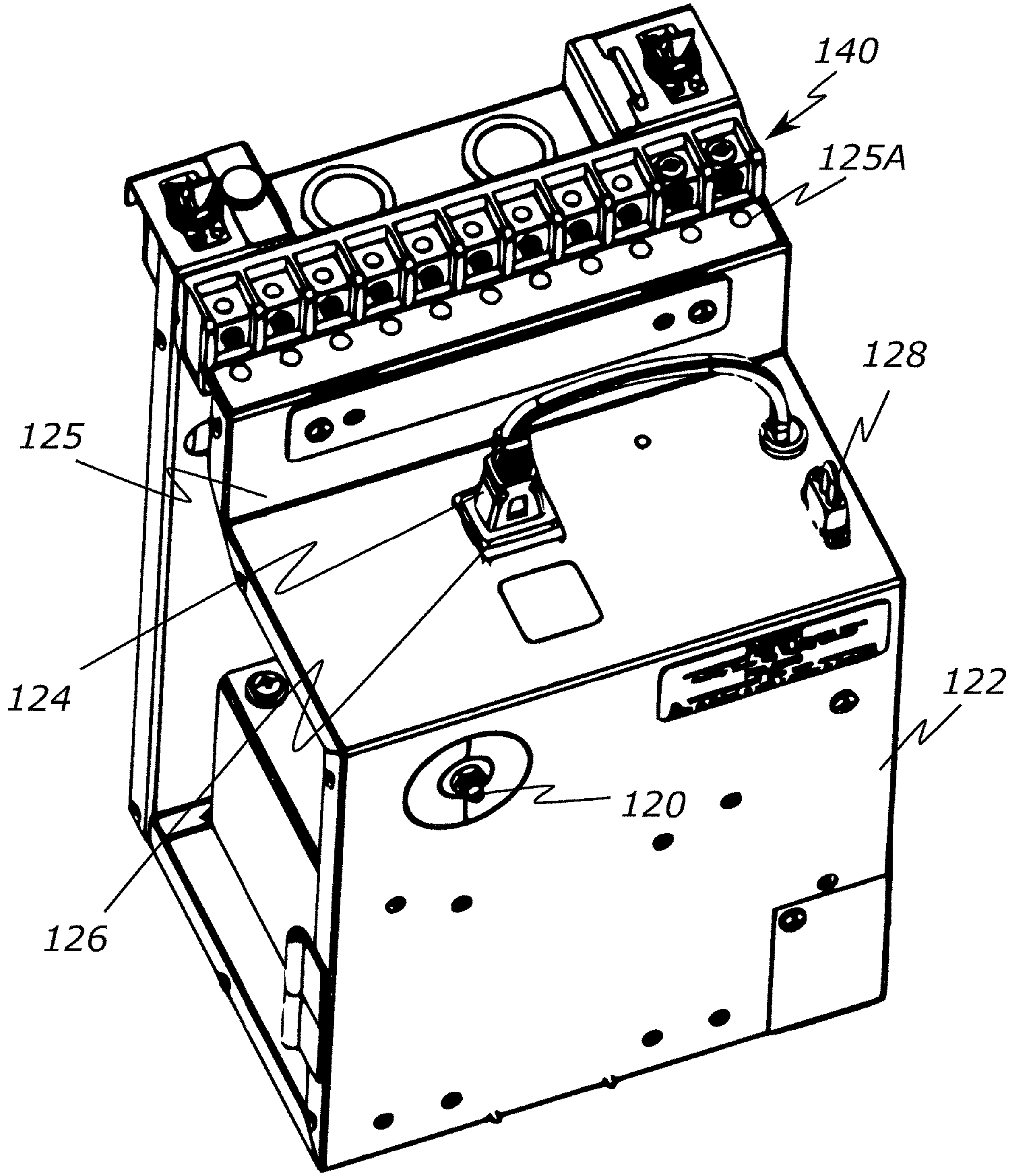
FIG. 6 is a view of the transformer assembly with all exterior panels removed.
Figure 7:
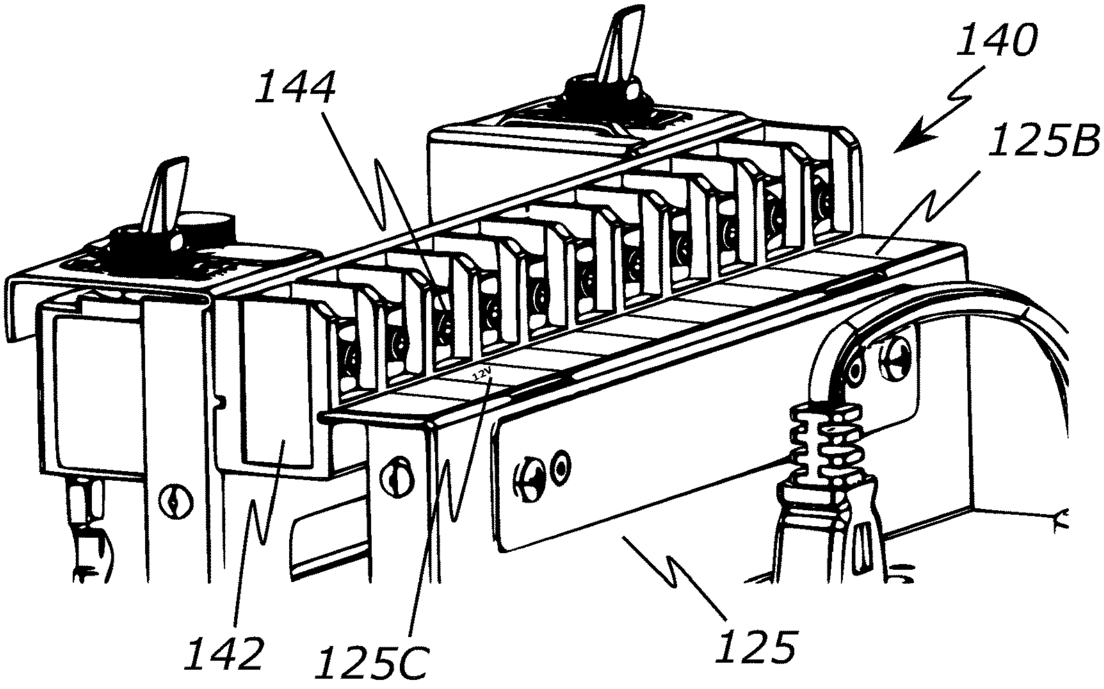
FIG. 7 is a view of a transparent or translucent terminal block assembly in the transformer assembly.

As seen in FIG. 7, an area adjacent to each lug 144 may include one or more indicia 125C to indicate characteristics of the lug 144, such as its voltage (e.g., 12 VAC). This adjacent area and indicia 125C can also be illuminated. For example, the indicia 125C may be located on a partially transparent strip or label 125B. This label 125B can be positioned on a top surface of the vertical panel 125 and may cover a plurality of apertures 125A (as seen in FIG. 6). These apertures 125A open to an area near the light source 150 and therefore allow some light to emanate from underneath the label 125B and illuminate the indicial 125C on the label. Alternately or additionally, the bottom of the terminal strip 142 may be configured such that it shines some light on the indicia 125C of the label 125B. For example, the lower edge or bottom vertical surface may be at least partially positioned above the label 125B and shaped so that it shines some light on the top surface of the label 125B.

Figure 8:
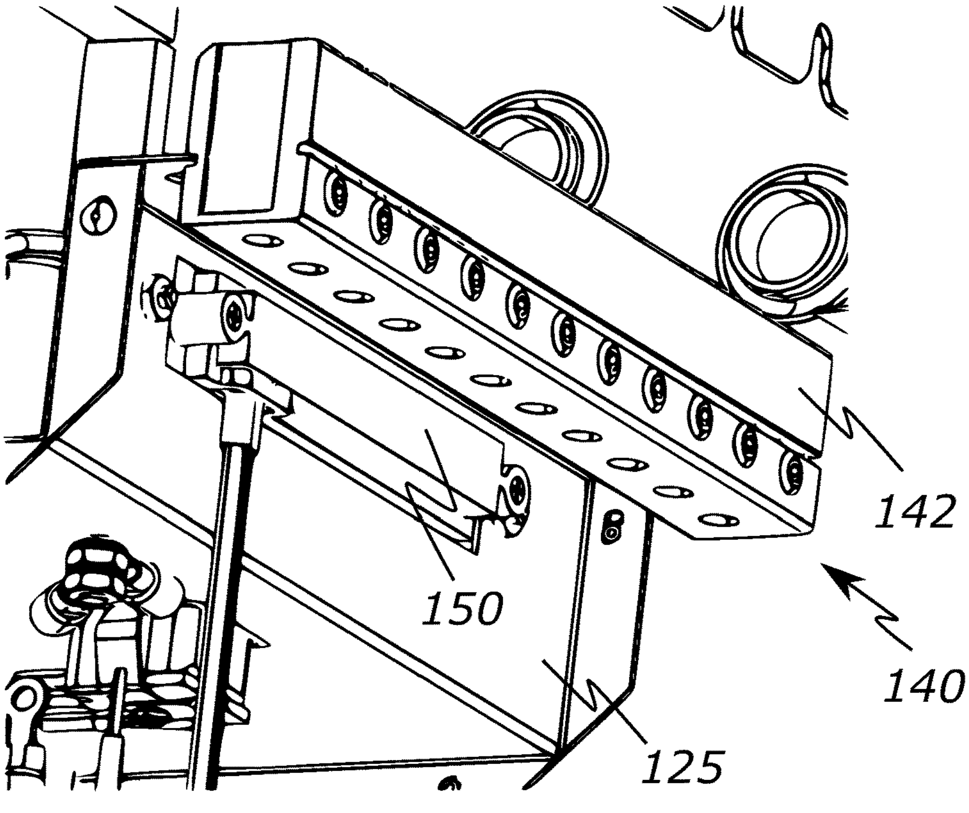
FIG. 8 is a bottom view of the terminal block assembly in the transformer assembly.
Figure 9:
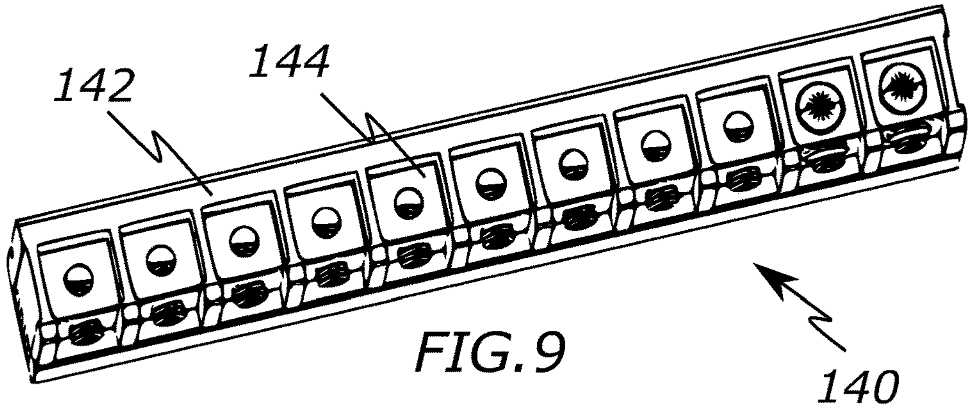
FIG. 9 is a top view of the terminal block assembly in the transformer assembly.
Figure 10:
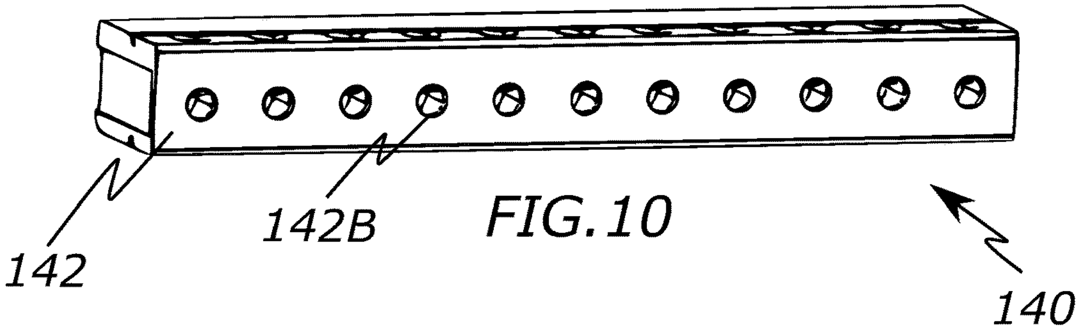
FIG. 10 is a bottom view of the terminal block assembly in the transformer assembly.
Figure 11:
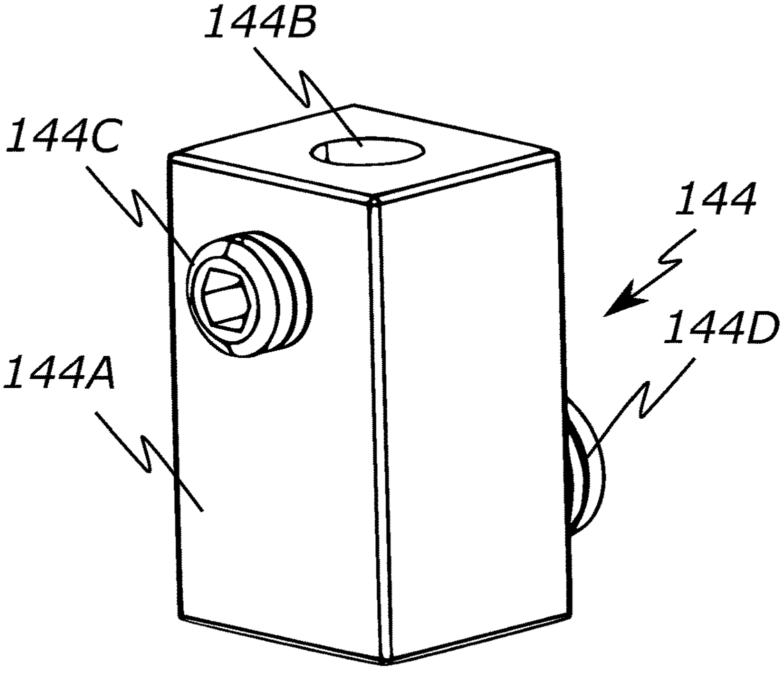
FIG. 11 is a side view of a terminal lug of the terminal block assembly.
Figure 12:
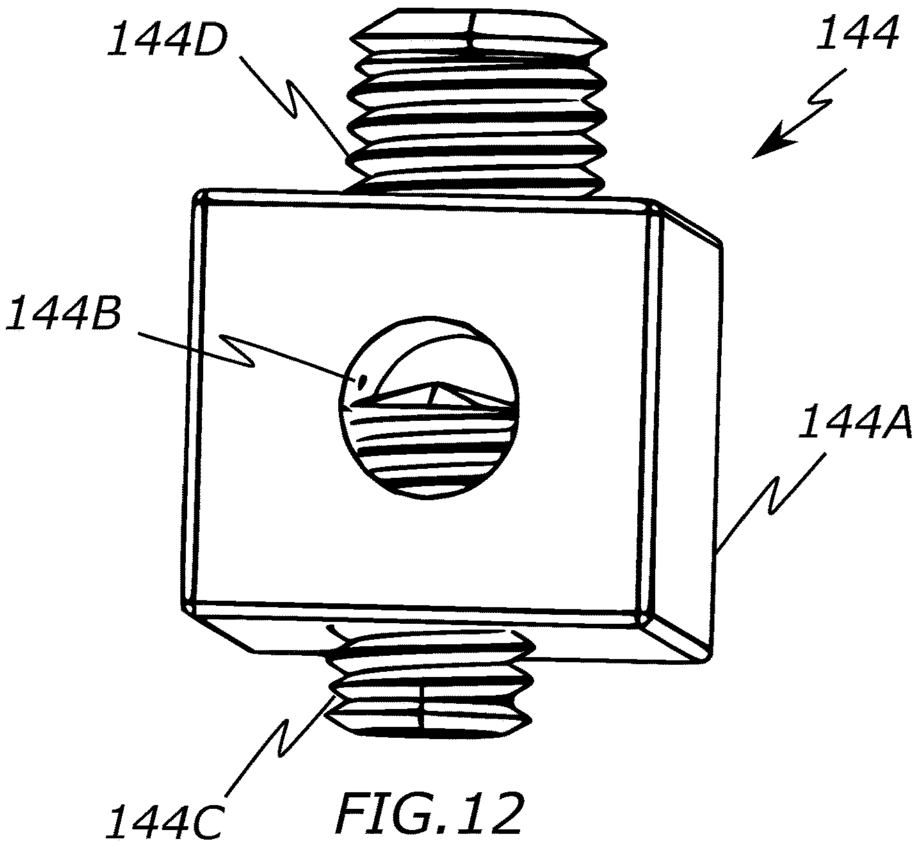
FIG. 12 is a top view of the terminal lug of the terminal block assembly.
Figure 13:
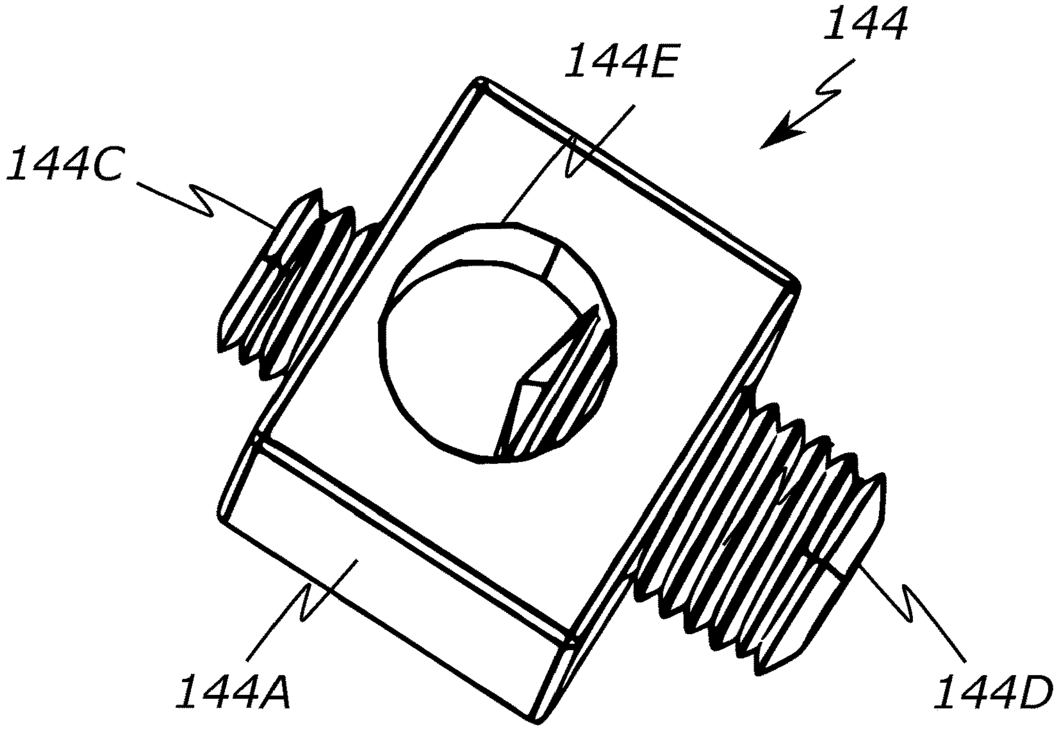
FIG. 13 is a bottom view of the terminal lug of the terminal block assembly.
Figure 14:
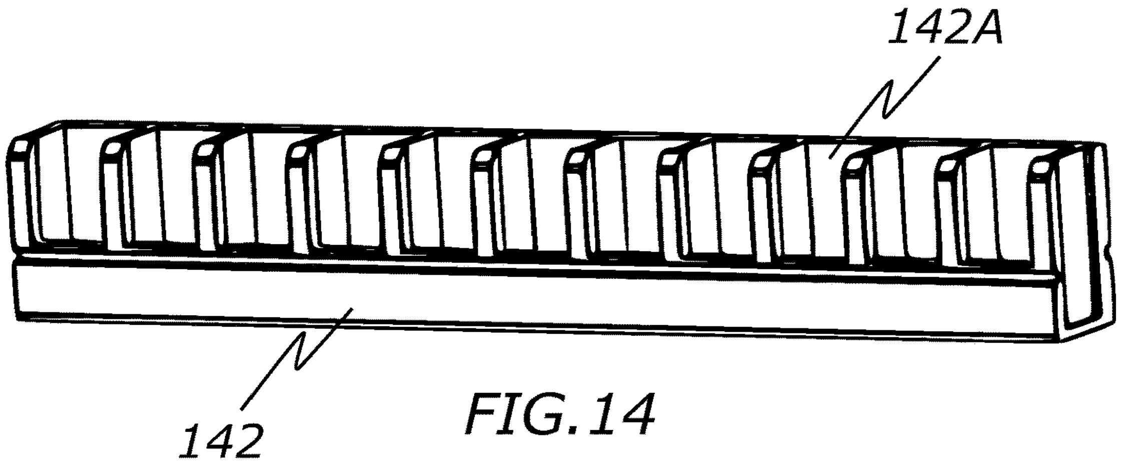
FIG. 14 is a front view of a terminal strip of the terminal block assembly.

FIG. 8 best illustrates the light source 150 which illuminates the terminal block assembly 140. In one embodiment, the light is fixed to a back side of vertical panel 125, adjacent and below the position of the terminal block 140. However, a variety of other positions for the light source 150 are also possible. For example, the light can be directly connected to the translucent terminal strip 142. Preferably, the light is composed of one or more LEDs within a mountable housing.

Figure 17:
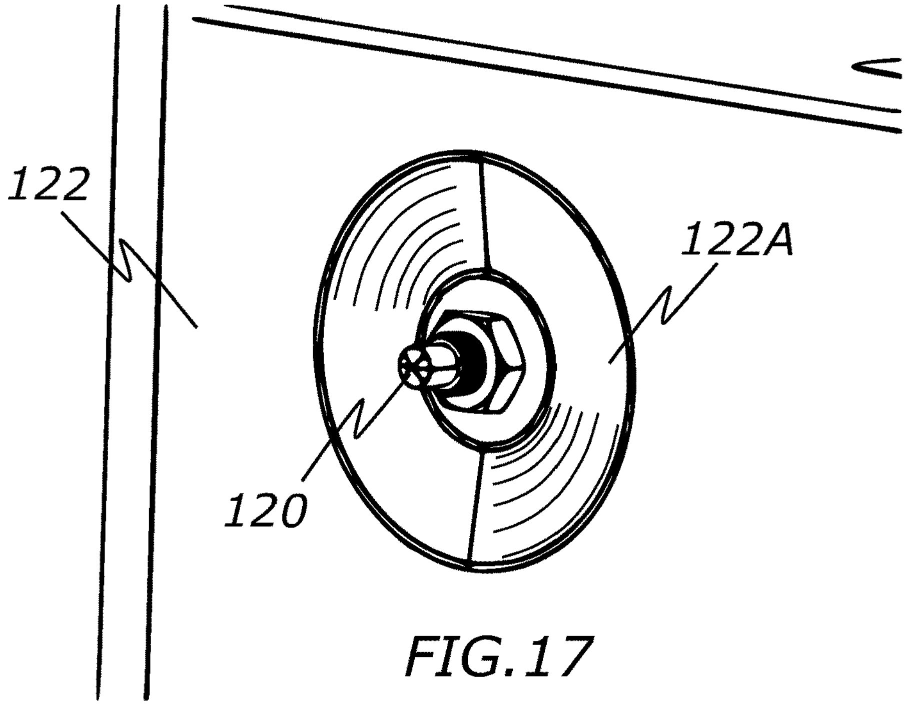
FIG. 17 is a front view of a switch of the transformer assembly.
Figure 18:
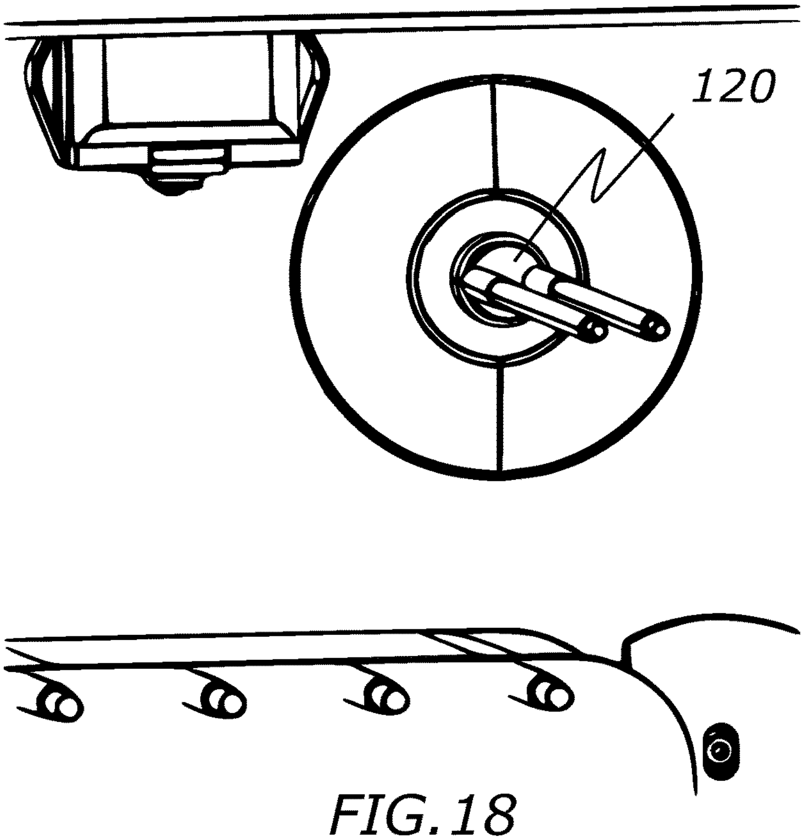
FIG. 18 is a back view of the switch of the transformer assembly.

FIGS. 17 and 18 illustrates the front and back, respectively, of the switch 120. Preferably, the switch 120 is mounted such that when the front door panel 102 is closed, the panel 102 presses against the switch 120, causing it to interrupt the circuit connected to the light source 150. Opening the panel 102 releases the switch 120 to cause the circuit to the light source 150 to be completed and thereby turn on. Optionally, the area 122A surrounding the switch can be depressed relative to the remaining areas of the panel 122 (e.g., a concave shape seen in FIG. 17) to avoid the need for washers or spacers.

Figure 19:
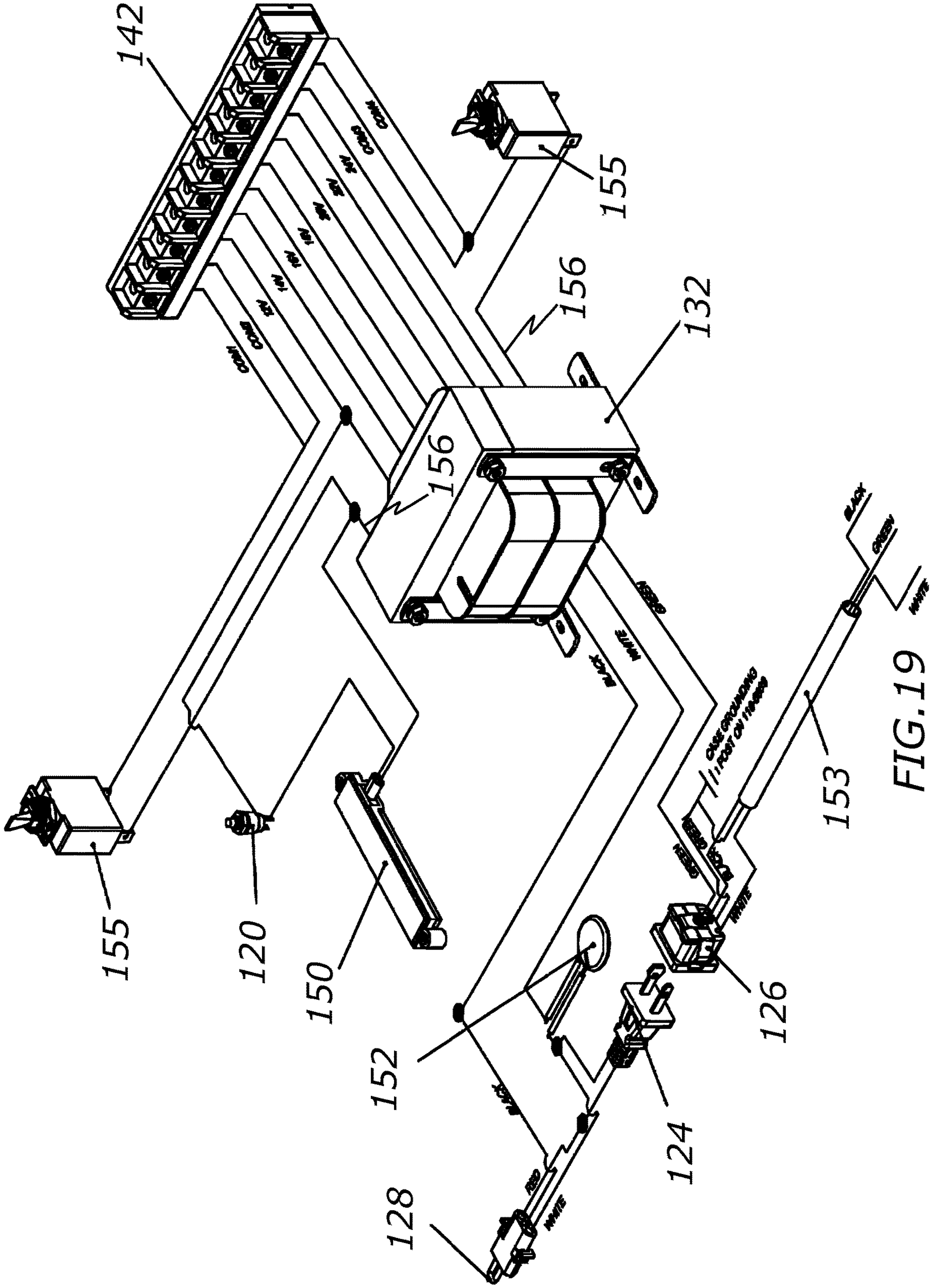
FIG. 19 is a plan view of the electrical system of the transformer assembly.

FIG. 19 illustrates a plan view of the electrical system of the transformer assembly. 120 VAC power is supplied via wire 153 to the power transformer 132 via an electrical path that includes the receptacle 126, electrical plug 124, shorting plug 128, and thermistor 152. The electrical plug 124, shorting plug 128, and thermistor 152 can interrupt the supply of power to the electrical transformer 132 based on the actions of the user (unplugging) or high temperature within the transformer assembly.

In one embodiment, the terminal block 140 of the present specification may be provided as an upgrade kit to upgrade a transformer assembly 100. The kit may provide the terminal block 140, the light source 150, a switch 120, and sufficient electrical wiring.

The transformer 132 then converts and outputs lower voltages at one or more voltage levels (e.g., 12 VAC, 14 VAC, 16 VAC, 18 VAC, 20 VAC, 22 VAC, and 24 VAC). In the present example, low voltage power (12 VAC-24 VAC) is supplied from the transformer 132, through the common lead wires 156, through the circuit breakers 155, to the four common lugs on the terminal block. The low voltage outputs (12 VAC-24 VAC) from transformer 132 are connected directly to the corresponding lugs on the terminal block 142. A circuit is completed when a load (a lighting fixtures, for example) is connected to one of the seven low voltage lugs and one of the common lugs. Power to the terminal block 140 is interrupted by disconnecting the common lead 156 to the common lugs via circuit breakers 155. The light source 150 and actuating switch 120 are connected to the 12 VAC and common lead, in parallel, between the transformer 132 and circuit breaker 155. Therefore, the light 150 has power as soon as transformer 132 has power. That allows the light 150 to operate independently from circuit breakers 155. That configuration also allows connections to the terminal block 142 to be made without the terminal block 142 being energized, while light 150 provides illumination.

Figure 20:
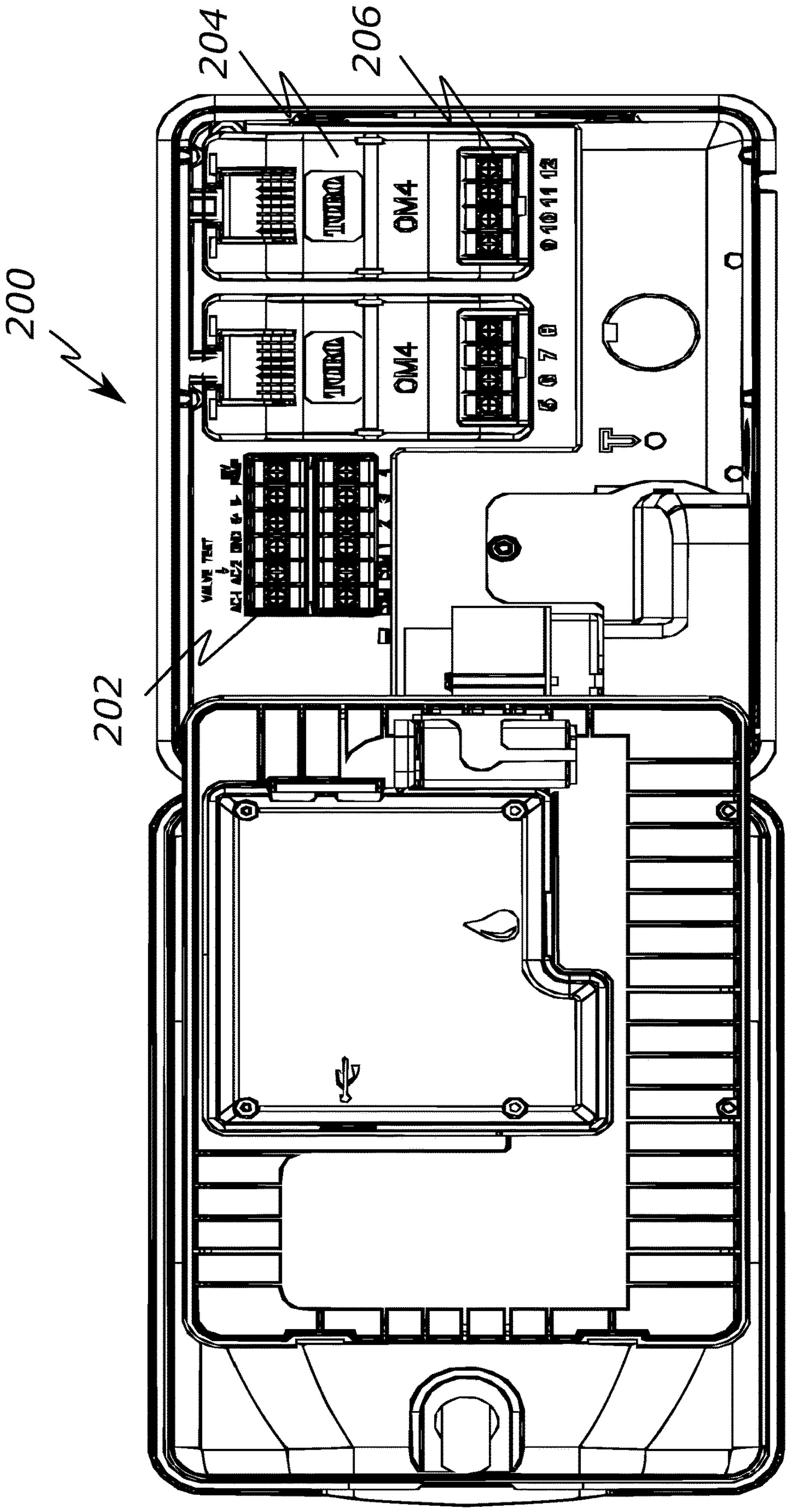
FIG. 20 is an interior view of an irrigation controller with terminal blocks.

The transparent terminal block of the present invention may also be used in similar devices in which terminal strips are used, particularly outdoors and/or around a residential or commercial property. One specific example is an irrigation controller 200, as seen in FIG. 20. Typically, irrigation controllers 200 activate and deactivate valves connected by a plurality of wires. In that respect, irrigation controllers often include one or more terminal blocks to connect these and other wires. For example, a controller 200 may include a permanent, fixed terminal block 202 and/or one or more irrigation modules 204 that each include their own terminal blocks 206. Additional details of irrigation controllers can be found in U.S. Pat. No. 10,542,684 which is incorporated herein by reference. Each of these terminal blocks may be configured similar to the terminal block 142 described in this specification. For example, the terminal blocks 202, 206 may be composed of a transparent or translucent material with a light source (e.g., LED) placed at or near the back of the terminal block. Additionally, the irrigation controller 200 may include a switch or similar mechanism to turn the lights on or off when the inner door (i.e., the pivoting irrigation faceplate) is opened or closed.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A transformer assembly for supplying low voltage electrical current, comprising:

a transformer housing comprising a plurality of panels and a door configured to open an interior of the transformer housing;

a power transformer configured for connection to an exterior power source;

a light source electrically connected to the power transformer; and, a terminal block assembly including a terminal strip positioned directly above the light source; the terminal block assembly comprising a transparent material such that the light source shines light beneath the terminal strip of the terminal block assembly causing the transparent material to illuminate.

2. The transformer assembly of claim 1, wherein the terminal strip is at least partially composed of the transparent material.

3. The transformer assembly of claim 2, wherein the terminal strip is entirely composed of transparent material.

4. The transformer assembly of claim 3, wherein the terminal block assembly further comprises a plurality of lugs having openings configured to engage an electrical wire.

5. The transformer assembly of claim 2, further comprising a label displaying a plurality of indicia relating to the terminal block assembly; wherein the terminal strip is configured to direct light from the light source onto a surface of the label.

6. The transformer assembly of claim 1, wherein the light source or is directly connected to the terminal block assembly.

7. The transformer assembly of claim 1, wherein the transparent material is a polycarbonate, acrylic, polystyrene, or polypropylene.

8. The transformer assembly of claim 1, further comprising a label displaying a plurality of indicia relating to the terminal block assembly; wherein the label is positioned over a plurality of openings configured to allow light from the light source to emanate therethrough so as to illuminate the label.

9. The transformer assembly of claim 1, wherein the transformer assembly is configured to supply power to one or more low voltage outdoor lights.

10. The transformer assembly of claim 1, wherein the transformer assembly is configured as an irrigation controller to power one or more irrigation valves.

11. A transformer assembly configured to supply low voltage electrical current, comprising:

a transformer housing comprising a plurality of panels and a door configured to open to expose an interior of the transformer housing;

a power transformer configured for connection to an exterior power source;

a light source electrically connected to the power transformer; and, a terminal block assembly positioned adjacent to the light source; the terminal block assembly being electrically connected to the power transformer and comprising 1) a terminal strip comprising at least some transparent material and forming a plurality of lug spaces, and 2) a plurality of lugs positioned in the plurality of lug spaces and configured to engage an electrical wire;

wherein the light source is positioned beneath the terminal strip such that the light source shines light into the terminal strip so as to cause the terminal block assembly to illuminate.

12. The transformer assembly of claim 11, wherein the terminal strip is entirely composed of transparent material.

13. The transformer assembly of claim 11, wherein the light source is positioned adjacent to and apart from the terminal block assembly or is directly connected to the terminal block assembly.

14. The transformer assembly of claim 11, wherein the transparent material is a polycarbonate, acrylic, polystyrene, or polypropylene.

15. The transformer assembly of claim 11, further comprising a label displaying a plurality of indicia relating to the terminal block assembly; wherein the label is positioned over a plurality of openings configured to allow light from the light source to emanate therethrough so as to illuminate the label.

16. The transformer assembly of claim 11, further comprising a label displaying a plurality of indicia relating to the terminal block assembly; wherein the terminal strip is configured to direct light from the light source onto a surface of the label.

17. The transformer assembly of claim 11, wherein the transformer assembly is configured to supply power to one or more low voltage outdoor lights or is configured as an irrigation controller to supply power to one or more irrigation valves.

18. The transformer assembly of claim 11, further comprising a switch configured to interrupt power from the transformer to the light source when the door is closed and configured to allow power from the transformer to the light source when the door is opened.

19. A kit for installing an illuminating terminal block in a transformer assembly, comprising:

a terminal block assembly comprising 1) a terminal strip comprising transparent material and forming a plurality of lug spaces, and 2) a plurality of lugs positioned in the plurality of lug spaces and configured to engage an electrical wire;

a light source configured to attach directly to or adjacent to a bottom of the terminal strip; and, a switch configured for electrical attachment to the light source.

* * * * *